(12) United States Patent
Cox, Jr. et al.

(10) Patent No.: US 11,281,183 B2
(45) Date of Patent: Mar. 22, 2022

(54) UNIFIED CONTROL SYSTEM AND METHOD FOR MACHINING OF PARTS

(71) Applicant: Cox Manufacturing Company, Inc., San Antonio, TX (US)

(72) Inventors: William T. Cox, Jr., San Antonio, TX (US); Can Saygin, Helotes, TX (US)

(73) Assignee: Cox Manufacturing Company, Inc., San Antonio, TX (US)

( * ) Notice: Subject to any disclaimer, the term of this patent is extended or adjusted under 35 U.S.C. 154(b) by 426 days.

(21) Appl. No.: 16/597,524

(22) Filed: Oct. 9, 2019

(65) Prior Publication Data
US 2021/0109500 A1 Apr. 15, 2021

(51) Int. Cl.
*G05B 19/4093* (2006.01)
(52) U.S. Cl.
CPC .......... *G05B 19/40931* (2013.01); *G05B 2219/32368* (2013.01); *G05B 2219/36327* (2013.01)
(58) Field of Classification Search
None
See application file for complete search history.

(56) References Cited

U.S. PATENT DOCUMENTS

2006/0106469 A1 5/2006 Huang et al.
2014/0277662 A1 9/2014 Kesler et al.

FOREIGN PATENT DOCUMENTS

WO   WO 2004023256 A2   3/2004

OTHER PUBLICATIONS

European Search Report for EP 20200897, dated Feb. 19, 2021.
Aris Technology, Aris: How it Works, Sep. 24, 2016.
Sheikh, A. K. et al., Optimal tool replacement and resetting strategies in automated manufacturing systems, International Journal of Production Research, 37:4, 917-937, Mar. 1, 1999.

*Primary Examiner* — Sean Shechtman
(74) *Attorney, Agent, or Firm* — Terrile, Cannatti & Chambers, LLP; Emmanuel A. Rivera (57) ABSTRACT

A method, system and computer-usable medium are disclosed for monitoring and controlling a machining process of parts. Data as to dimensions of produced parts are gathered during a production process. The parts are produced based on part control plan. The data of the dimensions are plotted as to statistical information related to a distribution curve. Determination is made if a trend in the dimensional data approaches an upper control limit and a lower control limit. Corrective action is taken if the trend approaches either the upper control limit or the lower control limit.

20 Claims, 8 Drawing Sheets

Part Control Plan

300

| Name | Type | Method | | LSL | USL | SS | mCpk | mCp | P? |
|---|---|---|---|---|---|---|---|---|---|
| A | Stock Dia. | Keyence | ▸ | 0.3735 | 0.3765 | 5 | 1.33 | 1.66 | ☑ |
| D | Hole Depth | Indicator | ▸ | -0.0350 | -0.0250 | 5 | 1.33 | 1.66 | ☐ |
| E | O/L Len. | Keyence | ▸ | 2.2650 | 2.2750 | 5 | 1.33 | 1.66 | ☑ |
| F | Len. Edge | Keyence | ▸ | 2.0650 | 2.0750 | 5 | 1.33 | 1.66 | ☑ |
| I | Len. Trans t... | Keyence | ▸ | 0.0970 | 0.1030 | 5 | 1.33 | 1.66 | ☐ |
| J | Len. Trans t. | Keyence | ▸ | 0.0650 | 0.0750 | 5 | 1.33 | 1.66 | ☑ |
| K | 0-0.9 Rad. | Keyence | ▸ | 0.0050 | 0.0150 | 5 | 1.33 | 1.66 | ☐ |
| K2 | 0-0.9 Rad. | Keyence | ▸ | 0.0050 | 0.0150 | 5 | 1.33 | 1.66 | ☐ |
| K3 | 0-0.9 Rad. | Keyence | ▸ | 0.0050 | 0.0150 | 5 | 1.33 | 1.66 | ☐ |
| K4 | 0-0.9 Rad. | Keyence | ▸ | 0.0050 | 0.0150 | 5 | 1.33 | 1.66 | ☐ |
| L | 0-0.25 Dia. | Keyence | ▸ | 0.1850 | 0.1890 | 5 | 1.33 | 1.66 | ☐ |
| L2 | 0-0.25 Dia. | Keyence | ▸ | 0.1850 | 0.1890 | 5 | 1.33 | 1.66 | ☐ |
| M | Len. Corner | Keyence | ▸ | 0.0150 | 0.0250 | 5 | 1.33 | 1.66 | ☐ |
| M2 | Len. Corner | Keyence | ▸ | 0.0150 | 0.0250 | 5 | 1.33 | 1.66 | ☐ |
| O | 0-0.25 Dia. | Keyence | ▸ | 0.0950 | 0.1050 | 5 | 1.33 | 1.66 | ☐ |
| S | 0-0.25 Dia. | Mic. 0-1" SPC Station | ▸ | 0.2480 | 0.2480 | 5 | 1.33 | 1.66 | ☑ |
| T | > 0.25 Dia. | Keyence | ▸ | 0.2480 | 0.2520 | 5 | 1.33 | 1.66 | ☑ |

602 {
- 8/30/2019 6:17:57 AM
- LEBOEUFR
- Lot#: 701001

604 {
- $\bar{X}$: 1.089520
- $\hat{\sigma}$: 0.000794
- R: 0.00190
- Cp: 1.26 (Min: 1.66)
- Cpk: 1.04 (Min: 1.33 @ 4σ Level)

606 {
- 5 Samples:
- 1.089000
- 1.088800
- 1.089400
- 1.089700
- 1.090700

608 {
- s: 0.000746
- c4: 0.94
- Bell Curve: [1.086344, 1.092696]

UNIFIED CONTROL SYSTEM AND METHOD FOR MACHINING OF PARTS

BACKGROUND OF THE INVENTION

Field of the Invention

The present application relates generally to an improved system and method of monitoring and controlling a machining process of parts.

Description of the Related Art

In automated machining of parts, such as computer numerical control or CNC machining of metal parts, various tools may be used in a high-volume machining or production process. For example, tools may be used to cut, drill, turn, etc. Such tools can be operated independent of another in the machining or production process. Particular tools may be used to create a particular dimension of a part. Each tool has a certain life that needs to be replaced when reached; otherwise, part dimensions are more likely to be out of specifications.

Over the production process, various factors can affect the performance of the tools, such as temperature, cutting oil, tool wear, etc. In order to process parts that meet requisite dimensions (i.e., part specifications), such factors can be monitored and appropriate corrective actions, such as tool replacement, can be made. Typically, an experienced technician (operator) can observe the production process and mentally note changes in dimensions, such as when tooling wears, machine operating temperature rises, new raw material (e.g., metal bars in a lathing process) are loaded into a machine, etc. The technician may estimate adjustments (i.e., corrective actions) in the production process based on experience working with the particular production process and taking small part samples.

Production data may be displayed on traditional statistical process control or SPC charts using part samples (i.e., sample data). An average dimension of sample data can be represented as a "dot" on an X-bar chart (used to monitor mean) within upper and lower control limits. For each dimension of a part, there is a separate X-bar chart. Similarly, range of a particular dimension from a sample can be displayed on an R chart. Likewise, as the X-bar chart, for each dimension, a separate R chart (used to monitor range) is needed. For example, if a production process involves a part with four dimensions that are to be monitored, there would be four X-bar charts and four R-bar charts. That would be eight charts to be monitored and interpreted. As the number of part dimensions increases, the number of charts to monitor and interpret increases. Because various tools may be used to process a particular dimension, an interpretation of an experienced technician (operation) of the charts is needed as to how which tools are affecting the changes as to particular dimension during the production process.

SUMMARY OF THE INVENTION

A method, system and computer-usable medium are disclosed for monitoring and controlling a machining process of parts. Data as to dimensions of produced parts are gathered during a production process. The parts are produced based on part control plan. The sample data of the dimensions are plotted as to statistical information related to a normal distribution curve. Determination is made if a trend in the dimensional data approaches an upper specification limit (USL) and a lower specification limit (LSL). Corrective action is required if the trend (normal distribution curve) approaches USL or LSL, or if the spread of the normal distribution curve is large, showing excessive variation.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

In certain embodiments, the described system, method, and computer product provides information as to how tools in a machining system are affected during a production process of parts. In particular, process control is provided which provides trends as to parts dimensions which correlate to the wear and effects on the tools that produce the parts.

A system, method, and computer-readable medium are disclosed for improved controlling and monitoring of the machining of parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
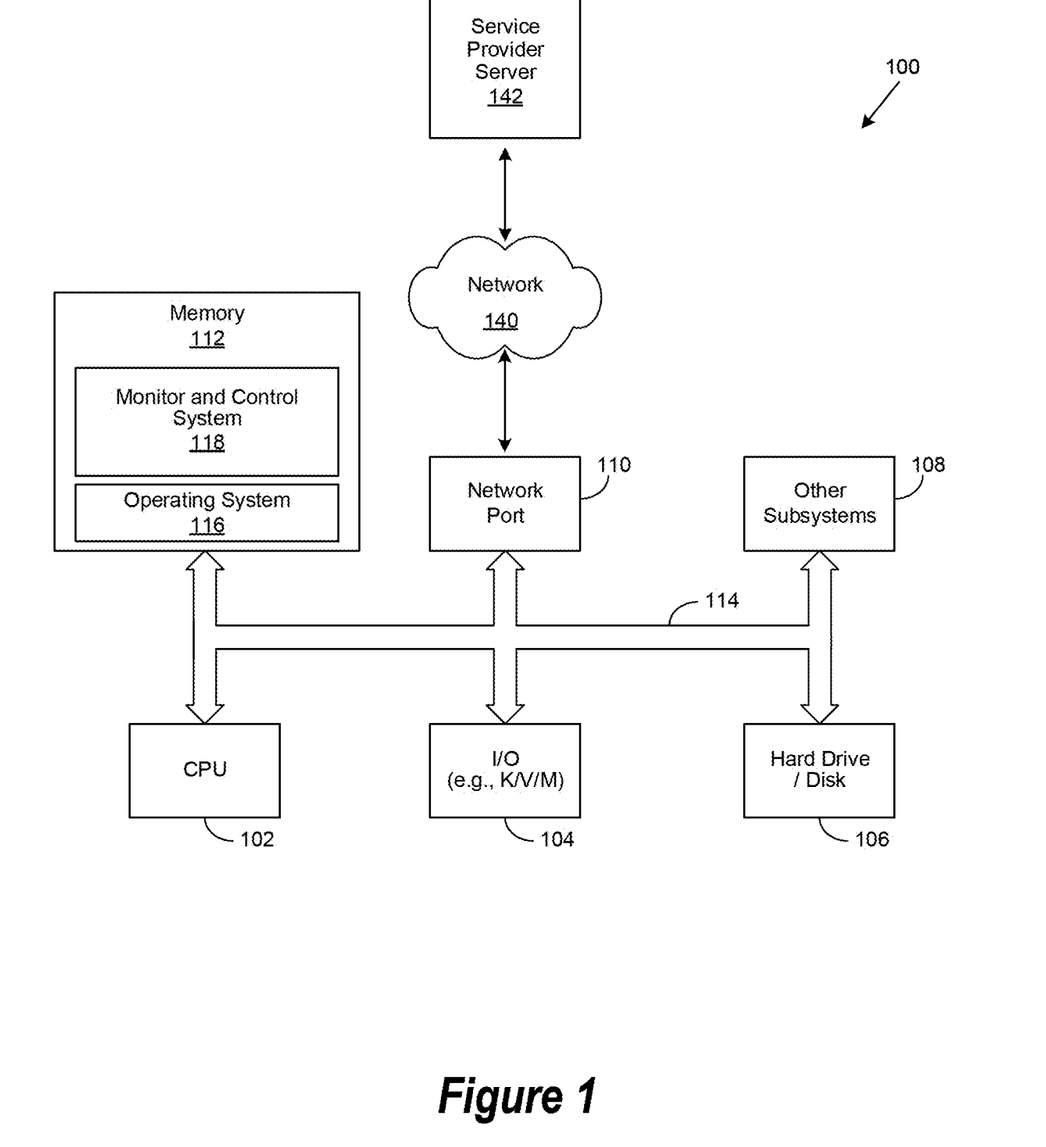
FIG. 1 is a block diagram of an information processing system capable of monitoring and controlling a machining of parts.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a monitor and control system 118. In certain implementations, the include a monitor and control system 118 is provided as a service from the service provider server 142.

In certain embodiments, the monitor and control system 118 provides for monitoring and controlling machining of parts. In certain implementations, the monitor and control system 118 is configured to analyze the behavior of a machining system, and particular the processing of parts by the machining parts, where the parts have certain dimensions.

Figure 2:
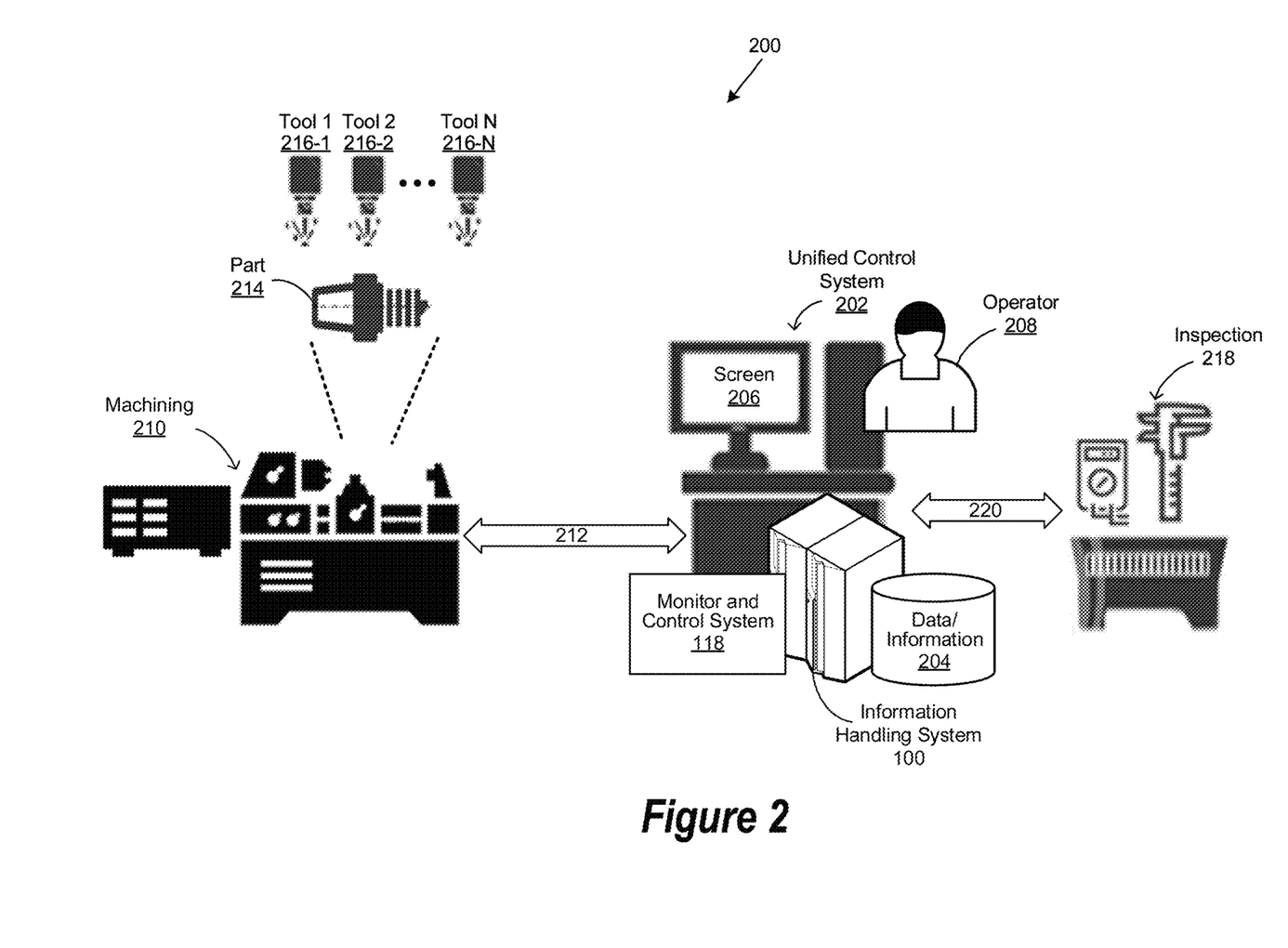
FIG. 2 is a block diagram of a system capable of processing machining of parts.

FIG. 2 shows a system capable of processing machining of parts. In particular, the system 200 supports a high-volume production process of parts. In certain implementations, the system 200 includes a unified control system 202. In certain embodiments, the unified control system 202 includes the information handling system 100 as described in FIG. 1. In certain embodiments, the unified control system 202 and information handling system 100 may be one and the same. A database or data/information store 204 is included with or connected to the unified control system 202. As further described below, certain data/information used in the monitoring and controlling of a machining process of parts can be stored in the data/information store 204. A screen 206 is provided to for a technician or operator 208 (e.g., operating technicians, process engineers, etc.) to view data/information as to the monitoring and controlling of the machining process, and to view in-process operation as to changes in dimensions of processed parts. The screen 206 can be include as part of the I/O devices 104 as described in FIG. 1.

The system 200 further includes a machining system 210. In certain implementations, the machining system 210 is used to machine metal parts and can include other subsystems, such as material (e.g., metal bar) loaders, lathing machines, drilling machines, cutting machines, etc. In other implementations, the machining system 210 is used to produce other parts. It is to be understood that machining system 210 may be used for other production processes and can include different subsystems.

In certain implementations, the machining system 210 is connected to the unified control system 202 by a two-way connection 212. The unified control system 202 can be enabled to receive process control data/information from the machining system 210, such as sensor data monitoring production processes performed at the machining system 210. Examples of data/information from machining system 210 can include CNC lathe inputs such as when a part is completed, when the lathe starts/stops, tool offset, temperature shift, etc. For a bar/material loader inputs can include when a bar/material is loaded, any alarms related to the loading, and pending outage of bars/material. In general, input can be gathered from multiple sources, including vision systems, digital micrometers, operator 208 attribute inputs, and other sources that are processed by the unified control system 202 for statistical assessment.

The production process at machining system 210 can be directed to a particular part 214. Part 214 can be defined by multiple dimensions, as furthered described below. Dimensions of samples of the part that are produced throughout the productions are measured/monitored to determine variations as to predetermined dimension requirements. The machining system 210 can include multiple and various tools, as represented by tool 1 216-1, tool 2 216-2 to tool 216-N to produce part 214. As the production process takes place, and variations as to sampled produces parts can occur, which can be due to particular affects upon tools 216.

In certain implementations, the system 200 includes an inspection station 218. In certain implementations, the inspection station 218 is used by the operator to inspect and measure sample parts (e.g., part 214) from production lots. The operator 208 may pull sample parts to be measured during the production process. For example, the operator 208 can take sample parts according to a part control plan (further described below) that shows sample size and part count-based frequency. The sample parts are inspected at the inspection station 218, where data as to dimensions, operator 208 name/identification, time of inspection, and lot number can be recorded. In certain implementations, a connection 220 can be provided to unified control system 202, where automatic or machine inspection can be performed, such as by robotic operations.

In general, the system 200, can provide for integration of enterprise resource planning (ERP) functions with shop floor level operations and operational visibility through timely decision support to the operator 200. The connection of the machining system 210, subsystems/components of machining system 210, and the inspection station 218 can provide sensor data and other information which can be processed into for timely decision making in a production environment where cycles times are measured in seconds.

As further discussed below, a unified control or UC chart can be implemented to show critical dimensions on one screen (e.g., screen 206). Also, as discussed below, the UC chart can show process performance at different snapshots in time on a vertical axis, and inspection data for each critical dimension on a horizontal axis. Each individual snapshot of sample data can show a current state of the process in terms of central tendency (i.e., mean or X-bar/$\bar{x}$) and process spread (i.e., standard deviation or $\sigma$). Furthermore, in certain implementations, the UC chart can simultaneously show both measurement data and attribute (e.g., go/no-go type gaging) type data and include pre-control type inspection data. By integrating the part control plan with inspection data, the UC chart can provide process correlation with product specification. As further discussed below, for certain implementations, the UC chart can provide for data assessment for production lot approval or sampling advisement. Using the UC chart, a determination can be made as to process stability compared to Cp and Cpk objectives, and related alerts. Cp and Cpk are further discussed below. Alert flags can be provided on the UC chart to established tool life limits and store tool life record and offset record. Such tool life record and offset record can be stored in data/information store 204.

Figure 3:
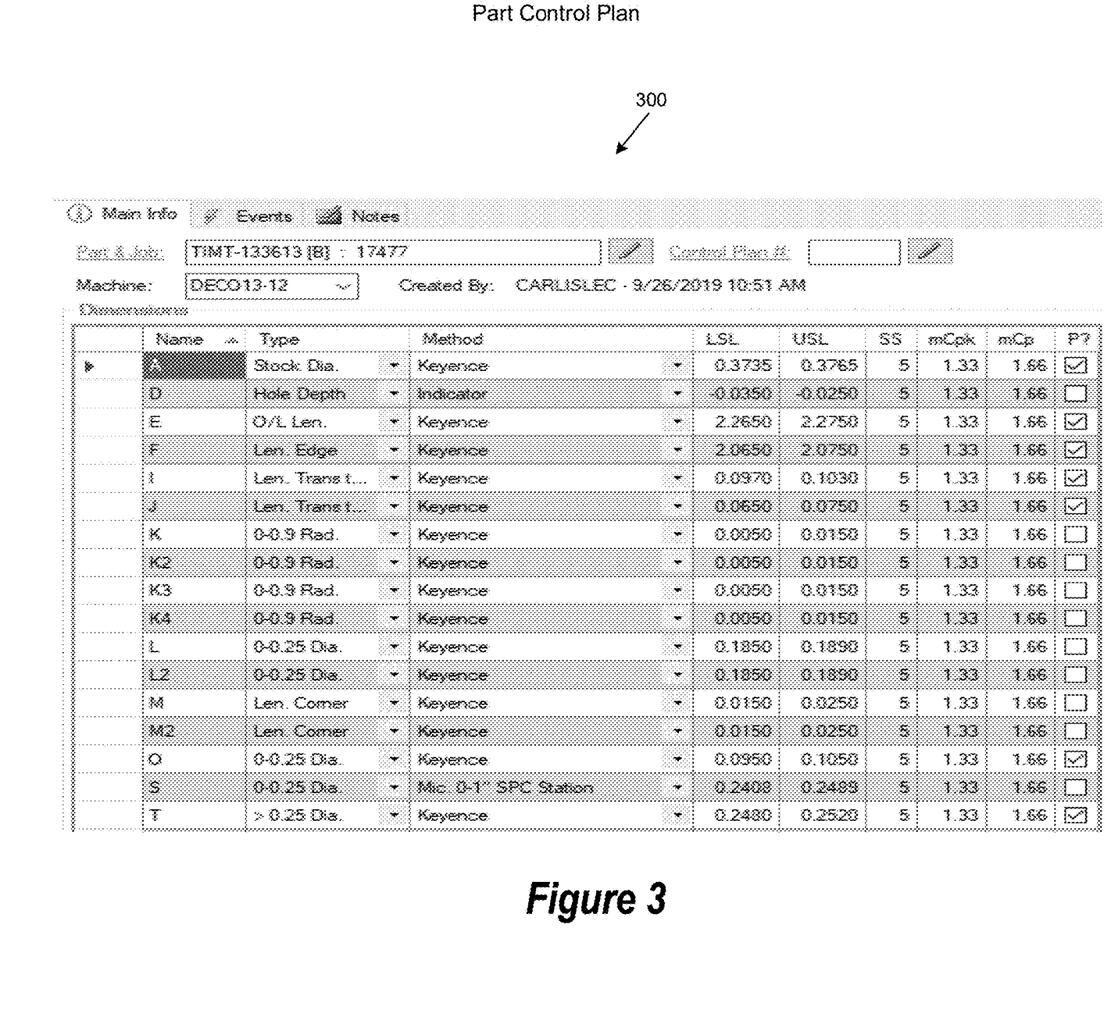
FIG. 3 illustrates a part control plan user interface.

FIG. 3 shows a part control plan user interface. A part control plan is developed prior to production, such as defined by personnel which can include process engineers and can be based on the part print and customer requirements. As part of the unified control system 202, the part control plan is a quality control and inspection document that shows what dimensions on a part are to be inspected as to particular tool. Sampling is be defined at particular frequency and sample size. The part control plan also keeps track of life remaining on "inspection tools" in terms of part count so that when reached, the inspection tools must be (re)calibrated. The user interface or UI 300 shows information that can be provided by a part control plan. User interface 300 can herein be referred to as part control plan UI 300. As shown, the user interface 300 can display different data and information regarding part or product specification. The data and information can be specific to a part to be processed, such as part 214 described in FIG. 2.

In certain implementations, the part control plan UI 300 can be in the form of a table. The part control plan UI 300 can be displayed next to another user interface or UI that shows a UC chart (i.e., UC chart UI). The UC chart UI can be in graphical format. Therefore, when displayed together, the part control plan UI 300 and UC chart UI can simultaneously provide a graphical tool and tabular information.

In certain implementations, and further discussed below, the UC chart UI can display past process behavior along a horizontal time axis. The process behavior can include flags, such as colored sample data (e.g., red/yellow visuals) indicating alerts as to potential quality issues and deviation from desired process behavior. When such alerts are displayed, necessary adjustments must be made related to the machining process to eliminate the undesired process behavior. If corrective actions do not eliminate the potential quality issues, then the part control plan can be reassessed. Such adjustments can include changing specifications on dimensions without violating customer requirements, selecting different cutting tools, assigning the job/process to another type of machine, etc. Therefore, a wholistic approach as to the production process can be provided.

Figure 4:
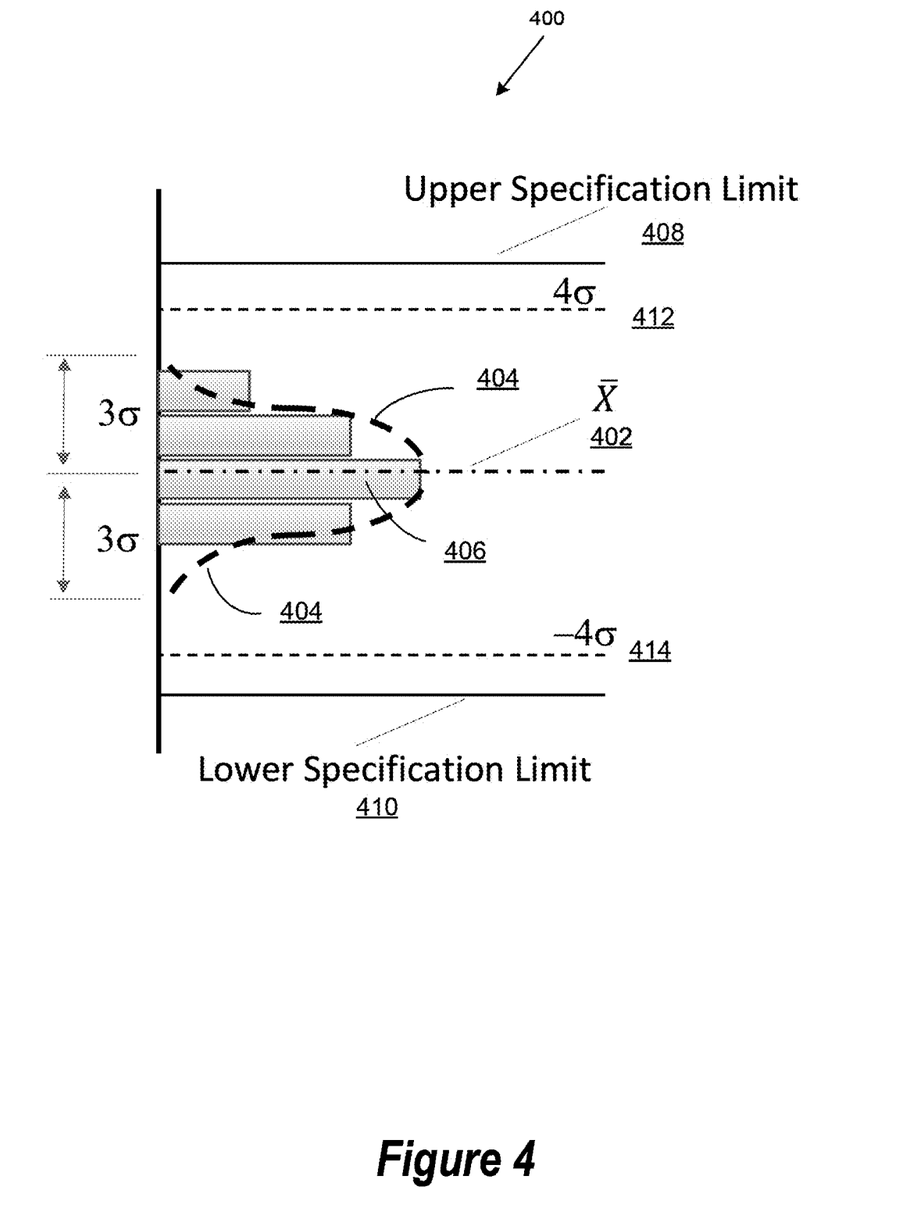
FIG. 4 illustrates an example of sample data included in an advanced unified control chart user interface.

FIG. 4 shows an example of sample data that can be included in a unified control (UC) chart user interface (UI), or UC chart UI. Sample data 400 can be a snapshot showing current state in a production process as to a particular part dimension. The information in the sample (i.e., sample of parts) data 400 can be conveyed in terms of central tendency (i.e., mean or $\bar{x}$) and process spread (i.e., standard deviation or $\sigma$). Sample data 400 includes a mean represented by $\bar{x}$ 402. A distribution curve 404 is also shown. The distribution curve 404 has a particular standard deviation or $\sigma$. The data obtained from a sample of parts is displayed as a histogram 406, overlaid on an estimated (horizontal) normal distribution curve.

An upper specification limit (USL) 408 and lower specification limit (LSL) 410 can be provided by sample data 400. Cp is defined as a ratio of tolerance (USL minus LSL) on a dimension to process variation ("width" of the normal distribution curve is equal to 6 times estimated standard deviation). For example, if the tolerance range is 0.0020 and the process variation measured by the "width" of the normal distribution curve (e.g., distribution curve 404) representing the process (e.g., 6 times the standard deviation) is 0.0005, then Cp=0.0020/0.0005=4. Therefore, if the process variation fits well within the tolerance range and if the process does not shift outside the specification limits, then acceptable parts are being produced on the machine. Due to tool wear or other factors, processes shift. The limit to allow a process to shift closer to one of the USL 408 or LSL 410 can be defined by Cpk. Cpk is the distance from the process mean or center (e.g., $\bar{x}$ 402) of the estimated normal distribution curve (e.g., distribution curve 404) to the closest specification limit (e.g., USL 408 or LSL 410). If the process mean is centered within 6 standard deviation; it is 3 standard deviations away from each "tail" of the curve of distribution curve 404. If tail of the curve is at one of the specification limits (e.g., USL 408 or LSL 410), then the Cpk=1, which can statistically indicate that unacceptable parts are being processed. When an alert/red flag is placed 4 standard deviations to the closest specification limit, then Cpk=4/3=1.33. In this example, $4\sigma$ 412 represents an alert when approaching USL 408, and $-4\sigma$ 414 represents an alert when approaching LSL 410. By setting the alert/flag, an indication is provided that process is undesirably shifting.

Figure 5:
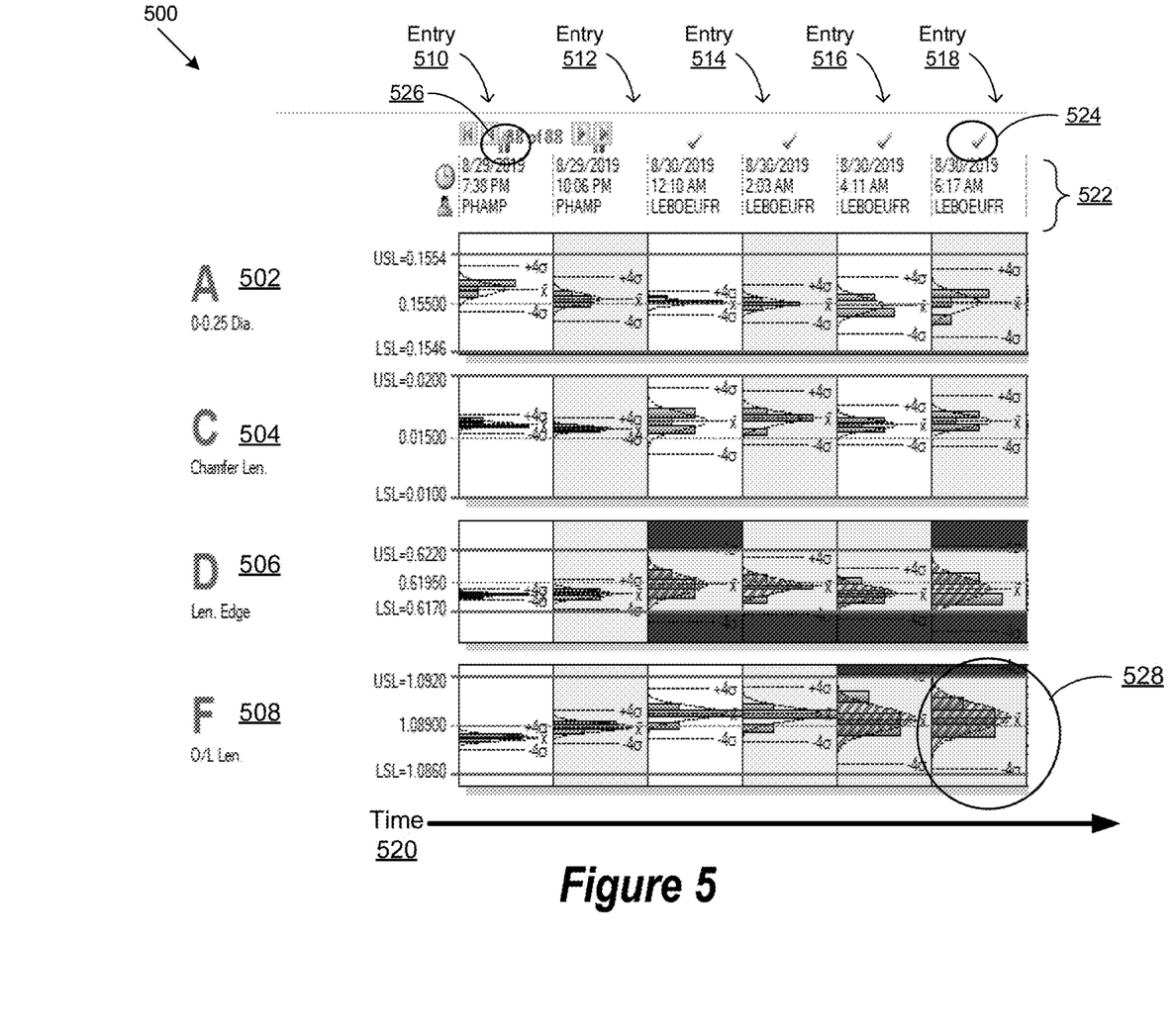
FIG. 5 illustrates an unified control chart user interface.

FIG. 5 shows an example of a unified chart user interface or UC chart UI. The UC chart UI 500 tracks the processing of a part (e.g. part 214 described in FIG. 2), and in particular critical dimensions of the part. In this example, the critical dimensions are identified as A 502, C 504, D 506 and F 508. The part as described in a product control plan, includes a product "print" that defines drawing, dimensions, tolerances, and other production-related specifications that must be followed in order to process an acceptable part within customer specifications.

Entries, as represented by entry 510, entry 512, entry 514, entry 516 to entry 518, are tracked over time 520. As discussed, inspection data for each critical dimension A 502, C 504, D 506 and F 508 is graphically displayed for each sample data, in the form of a horizontal estimated normal distribution curve.

UC chart UI 500 displays critical dimension A 502, C 504, D 506 and F 508 in rows (horizontal) and estimated process mean and process variation of each dimension in columns represented by entry 510, entry 512, entry 514, entry 516 to entry 518. Each column is a snapshot in time and new columns are added to the right as samples are inspected. In other words, columns represent the time axis 520 from left to right, which displays historical process data. Upper specification limit (e.g., USL 408) and lower specification limit (e.g., LSL 410) of a corresponding dimension are displayed. As discussed, a histogram (e.g., histogram 406) and distribution curve (e.g., distribution curve 404) can be displayed for each sample data, based on the measurement of the corresponding dimension on the sample parts. The measurement data can be used to estimate the process mean (e.g., $\bar{x}$ 402) and standard deviation or $\sigma$, as a normal distribution curve (e.g., distribution curve 404) displayed horizontally. The (e.g., histogram 406) and distribution curve (e.g., distribution curve 404) can be displayed together with the USL and LSL lines (e.g., USL 408 and LSL 410).

As discussed, if the estimated normal distribution curve is within the USL and LSL lines restricted by Cp and Cpk values, the process is acceptable. Otherwise, for certain implementations, if the normal distribution curve is closer to USL or LSL and violates the Cpk limit, an alert can be raised, which can indicate that a process shift may be needed, such that the corresponding dimension stays within USL and LSL without violating the Cpk limit. In certain implementations, an alert can be shown as color indictor (e.g., yellow for pending violation of Cp or CPk, red for immediate corrective action needed).

When process variation increases, the spread of the measured dimension increases, which is indicated by a wider-looking normal distribution curve. For example, in this case when the process variation exceeds the Cp limit, then a grid (i.e., sample data entry) on the UC chart UI 500 chart turns yellow, which can indicate "reduction in reduce process variability is needed."

In certain implementations, the top row 518 of the UC chart UI 500 can be used to display actions that are taken by an operator (e.g., operator 208 of FIG. 2). For example, a check mark 524 can be used to indicate that the operator has acknowledged the existence of a particular issue. Tool changes and/or related notes can be inputted by the operator and identified as a tool icon 526.

Therefore, information provided by the UC chart through the UC chart UI 500 includes a real time statistical quality using one graphical view of a display of both the movement of central tendency of the process and the movement of the process spread, in addition to displaying the time lapse between sampling. The UC chart provides a graphical display of a process history and status, enables the ability to determine process shifts, process deterioration, and a more optimized intervention with the process. In summary, the UC chart provides snapshot of the process current state central tendency and process spread; process correlation with product specification; process stability compared to Cp objectives; process stability compared to Cpk objectives; intuitive process interpretation; and tracking of multiple key features on one screen. Functions provided through the UC chart can include flag alert/alerts to Cpk failures; flag alert/alert to Cp failure; flag alert/alert to established tool life limits; used tool life record and offset record; tool life tracking and limit alerts; model for evaluating job intervention, and data assessment for production lot approval or sampling advisement.

In certain implementations, a detailed information as to a sample data grid can be performed. In particular, when additional/detailed information is needed as to a flagged/alerted sample data, such as 528, additional/detailed information is provided.

Figure 6:
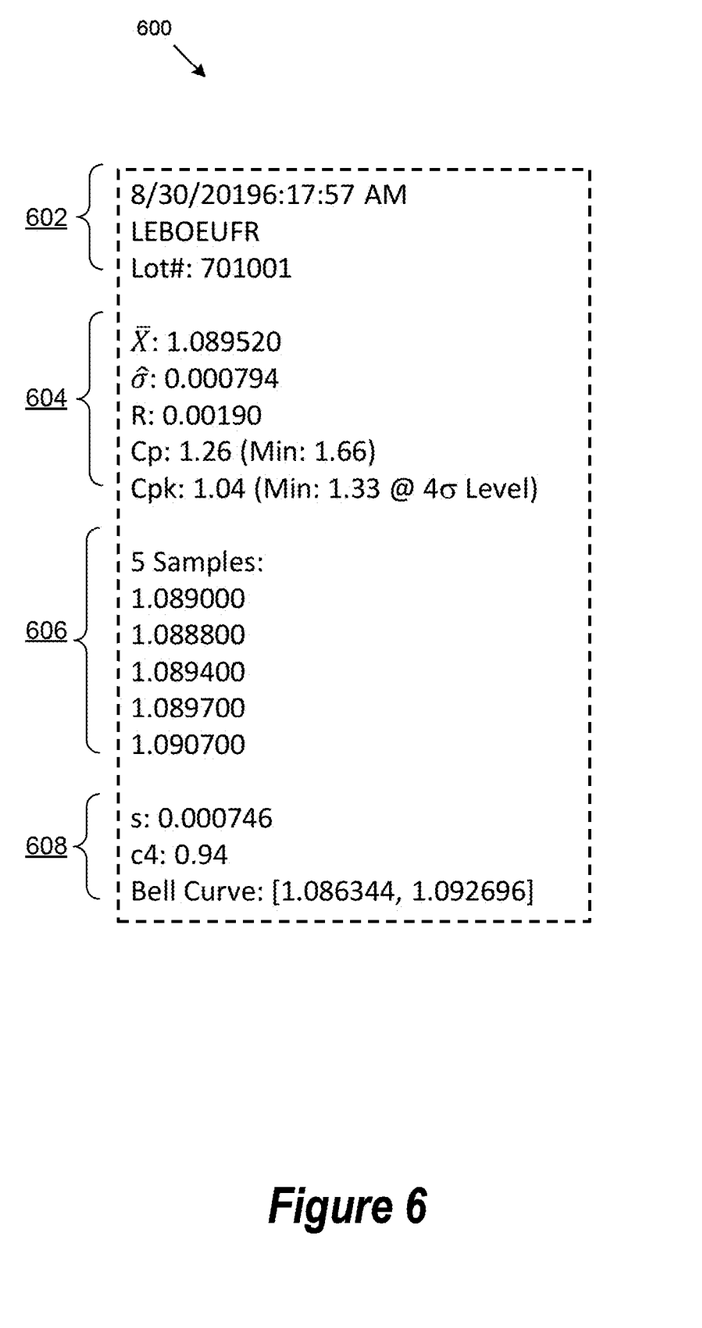
FIG. 6 illustrates detailed information as to sample data.

FIG. 6 shows detailed information as to sample data 528. The detailed information 600 can include operator/lot details 602 to assist in data assessment for production lot approval or sampling advisement and statistical details 604 which can assist in process stability compared to Cp and Cpk objectives, and related alerts. Additional information can include the number of samples taken 606 and other statistical data 608.

Figure 7:
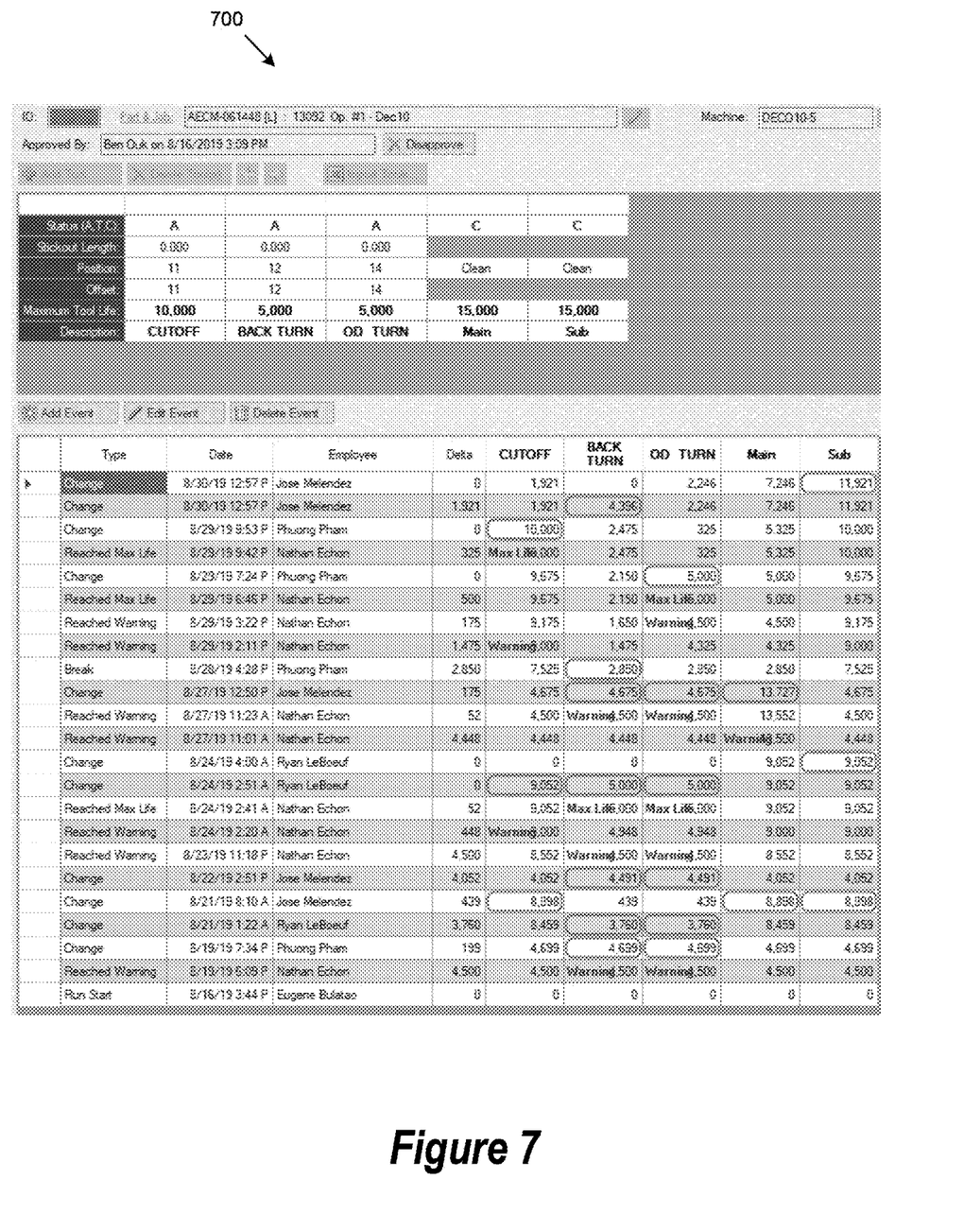
FIG. 7 illustrates a tool life administration user interface.

FIG. 7 shows a tool life administration user interface. In certain implementations, a static table of information can be provided. In the example of CNC machining, the displayed table of information can include cutting tool information, including length, position, offset, and life of each cutting tool required by the production job. Below the cutting tool information table, a dynamic table is used to keep track of part count for each cutting tool. A machine tool can communicate part count automatically with the unified control system 202. Built-in rules can be used to display warnings to an operator to change the tool by comparing remaining tool life (measured in "number of parts") against the dynamic part count. Tool change can be captured and displayed by unified control system 202 where the tool life is set to maximum tool life and count down restarts.

By capturing the "tool life" related events along a vertical timeline where the newest data is in the top row and the oldest data is in the bottom row of the table, the tool life administration can ensure timely tool changes so that worn out tools are taken out of production before leading to quality issues. Similar to the design concept of the UC chart as part of the unified control system 202, tool life administration user interface provides historical data on tools and related events for a production job, providing information that can be used to investigate cutting tool trends and operator behavior, which can lead to operational awareness, accountability, and high quality parts.

Figure 8:
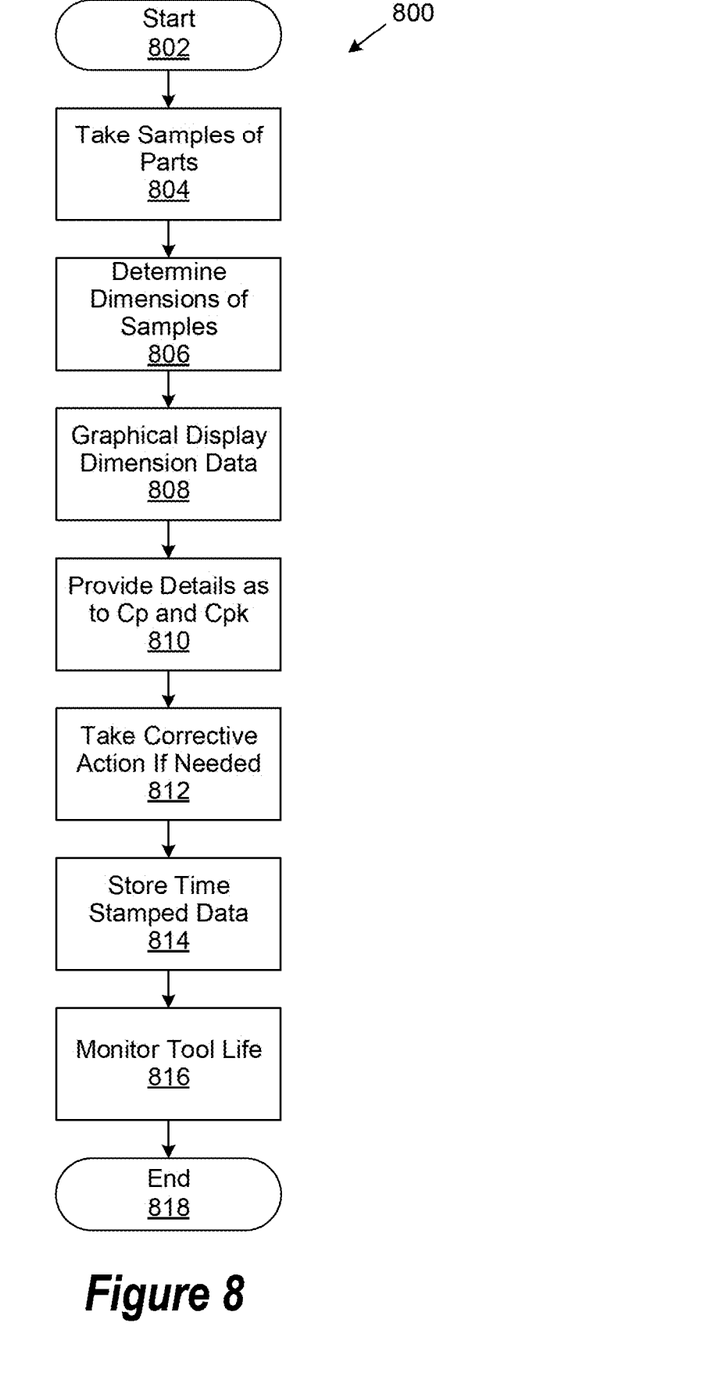
FIG. 8 is a generalized flowchart for monitoring and controlling a machining process of parts.

FIG. 8 is a generalized flowchart 800 for monitoring and controlling a machining process of parts. At block 802 the process 800 starts. At step 804, samples are taken according to a part control plan that shows sample size and part count-based frequency. At step 806, a determination is made as to the sampled parts as to dimensional data per the part control plan. At step 808, the dimensional data for each critical dimension is displayed graphically in the form of a horizontal estimated normal distribution curve. At step 810, provide respective time-stamped sample data showing details as to Cp and Cpk. If Cp exceeds a Cp minimum value, the process variation can be reduced. If Cpk exceeds a Cpk minimum value, then respective cutting tools can be off set. At step 812, corrective action as to the process can take place. At step 814, time stamped data can be stored and monitored to determine if sampling can be increased and reduce inspection time. At step 816, parts counts can be used to monitor tool life and provide any alerts as to changing tools. At block 818, the process 800 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles

What is claimed is:

1. A computer implemented method for monitoring and controlling a machining process of parts comprising:
   gathering dimension data of a number samples of parts in a production lot, wherein the parts are produced based on a part control plan;
   plotting the dimension data of the samples as to statistical information related to a distribution curve;
   determining if a trend in the dimensional data approaches an upper control limit and a lower control limit;
   taking corrective action if the trend approaches either the upper control limit or the lower control limit; and
   showing, on a user interface, information that is provided by the part control plan and the information being a quality control and inspection document that shows what dimensions on a part are to be inspected by a particular tool, wherein particular tools are used to create a particular dimension of a part;
   showing, on the user interface, the part control plan further showing sample size and part count-based frequency;
   displaying, on the user interface, process behavior including flags including colored sample data indicating alerts as to potential quality issues and deviation from desired process behavior;
   indicating, by an alert, if an immediate corrective action is needed; and
   tracking, by the part control plan, life remaining on inspection tools in terms of part count so that when reached, the inspection tools must be calibrated.

2. The method of claim 1, wherein the gathering dimension data of samples of parts is related to one or more tools used in producing the parts.

3. The method of claim 1, wherein the plotting the dimension data implements a unified control chart that includes sample data of critical dimensions for producing the parts tracked over time during a production process of the parts.

4. The method of claim 3, wherein the sample data includes central tendency (mean or $\bar{x}$) and process spread.

5. The method of claim 1, wherein the upper control limit and the lower control limit are defined by Cp and Cpk values.

6. The method of claim 1 further comprising monitoring tool life based on the dimension data of the samples.

7. The method of claim 1 further comprising increasing the number of samples if no corrective action is determined.

8. A system comprising:
a processor;
a data bus coupled to the processor; and
a computer-usable medium embodying computer program code, the computer-usable medium being coupled to the data bus, the computer program code used for monitoring and controlling a machining process of parts and comprising instructions executable by the processor and configured for:
gathering dimension data of a number samples of parts in a production lot, wherein the parts are produced based on a part control plan;
plotting the dimension data of the samples as to statistical information related to a distribution curve;
determining if a trend in the dimensional data approaches an upper control limit and a lower control limit;
taking corrective action if the trend approaches either the upper control limit or the lower control limit; and
showing, on a user interface, information that is provided by the part control plan and the information being a quality control and inspection document that shows what dimensions on a part are to be inspected by a particular tool, wherein particular tools are used to create a particular dimension of a part;
showing, on the user interface, the part control plan further showing sample size and part count-based frequency;
displaying, on the user interface, process behavior including flags including colored sample data indicating alerts as to potential quality issues and deviation from desired process behavior;
indicating, by an alert, if an immediate corrective action is needed; and
tracking, by the part control plan, life remaining on inspection tools in terms of part count so that when reached, the inspection tools must be calibrated.

9. The system of claim 8, wherein the gathering dimension data of samples of parts is related to one or more tools used in producing the parts.

10. The system of claim 8, wherein the plotting the dimension data implements a unified control chart that includes sample data of critical dimensions for producing the parts tracked over time during a production process of the parts.

11. The system of claim 10, wherein the sample data includes central tendency (mean or $\bar{x}$) and process spread.

12. The system of claim 8, wherein the upper control limit and the lower control limit are defined by Cp and Cpk values.

13. The system of claim 8 further comprising monitoring tool life based on the dimension data of the samples.

14. The system of claim 8 further comprising increasing the number of samples if no corrective action is determined.

15. A non-transitory, computer-readable storage medium embodying computer program code, the computer program code comprising computer executable instructions configured for:
gathering dimension data of a number samples of parts in a production lot, wherein the parts are produced based on a part control plan;
plotting the dimension data of the samples as to statistical information related to a distribution curve;
determining if a trend in the dimensional data approaches an upper control limit and a lower control limit;
taking corrective action if the trend approaches either the upper control limit or the lower control limit; and
showing, on a user interface, information that is provided by the part control plan and the information being a quality control and inspection document that shows what dimensions on a part are to be inspected by a particular tool, wherein particular tools are used to create a particular dimension of a part;
showing, on the user interface, the part control plan further showing sample size and part count-based frequency;
displaying, on the user interface, process behavior including flags including colored sample data indicating alerts as to potential quality issues and deviation from desired process behavior;
indicating, by an alert, if an immediate corrective action is needed; and
tracking, by the part control plan, life remaining on inspection tools in terms of part count so that when reached, the inspection tools must be calibrated.

16. The non-transitory, computer-readable storage medium of claim 15, wherein the gathering dimension data of samples of parts is related to one or more tools used in producing the parts.

17. The non-transitory, computer-readable storage medium of claim 15, wherein the plotting the dimension data implements a unified control chart that includes sample data of critical dimensions for producing the parts tracked over time during a production process of the parts.

18. The non-transitory, computer-readable storage medium of claim 15, wherein the upper control limit and the lower control limit are defined by Cp and Cpk values.

19. The non-transitory, computer-readable storage medium of claim 15 further comprising monitoring tool life based on the dimension data of the samples.

20. The non-transitory, computer-readable storage medium of claim 15 further comprising increasing the number of samples if no corrective action is determined.

* * * * *